(12) United States Patent
Ito et al.

(10) Patent No.: US 10,853,010 B2
(45) Date of Patent: Dec. 1, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Naoki Ito, Tokyo (JP); Takashi Miyauchi, Inagi (JP); Yutaro Kamata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/295,968

(22) Filed: Mar. 7, 2019

(65) Prior Publication Data

US 2019/0286383 A1    Sep. 19, 2019

(30) Foreign Application Priority Data

Mar. 13, 2018    (JP) .................... 2018-045959

(51) Int. Cl.
*H04N 1/387* (2006.01)
*G06F 3/12* (2006.01)
*G06K 15/02* (2006.01)

(52) U.S. Cl.
CPC ............ *G06F 3/125* (2013.01); *G06F 3/1204* (2013.01); *G06F 3/1256* (2013.01); *G06F 3/1286* (2013.01); *H04N 1/3873* (2013.01); *H04N 1/3878* (2013.01); *H04N 2201/0094* (2013.01)

(58) Field of Classification Search
None
See application file for complete search history.

(56) References Cited

U.S. PATENT DOCUMENTS

| 5,075,785 | A | * | 12/1991 | Sugishima | ............. H04N 1/387 358/296 |
| 5,249,069 | A | * | 9/1993 | Petilli | ................ H04N 1/00681 358/488 |
| 5,794,104 | A | * | 8/1998 | Maruyama | ........... H04N 1/3875 358/448 |
| 5,901,253 | A | * | 5/1999 | Tretter | .................... G06T 3/606 358/452 |

(Continued)

FOREIGN PATENT DOCUMENTS

| JP | 05145738 | * | 6/1993 | ............. H04N 1/387 |
| JP | 07-261599 A | | 10/1995 | |

(Continued)

*Primary Examiner* — Beniyam Menberu
(74) *Attorney, Agent, or Firm* — Canon U.S.A., Inc. IP Division

(57) ABSTRACT

A tilt-corrected document image is obtained by performing image analysis processing on a scan image to detect a document area and performing extraction and tilt correction of a document image based on the detected document area. A repeat target area is set based on the obtained tilt-corrected document image. The number of repetitions in repeatedly laying out the repeat target area for each of a plurality of candidate sheet sizes is calculated, and a list screen showing the calculated numbers of repetitions for the respective plurality of candidate sheet sizes is displayed. A repeat layout-processed output image is generated by repeatedly laying out an image of the repeat target area within a sheet size specified by a user, and print processing is made executable.

16 Claims, 13 Drawing Sheets

(56) References Cited

U.S. PATENT DOCUMENTS

| | | | |
|---|---|---|---|
| 6,430,320 B1* | 8/2002 | Jia | G06K 9/32 382/289 |
| 6,493,470 B1* | 12/2002 | Ikeda | G06K 9/3283 382/289 |
| 6,831,755 B1* | 12/2004 | Narushima | H04N 1/3878 358/1.9 |
| 2001/0014183 A1* | 8/2001 | Sansom-Wai | G06K 9/32 382/289 |
| 2002/0176120 A1* | 11/2002 | O'Callaghan | H04N 1/38 358/453 |
| 2003/0053681 A1* | 3/2003 | Jia | H04N 1/38 382/154 |
| 2003/0152291 A1* | 8/2003 | Cheatle | G06T 3/608 382/296 |
| 2004/0163049 A1* | 8/2004 | Mori | G06F 17/248 715/274 |
| 2005/0099660 A1* | 5/2005 | Yada | H04N 1/00416 358/498 |
| 2006/0129539 A1* | 6/2006 | Nakatomi | G06F 16/16 |
| 2007/0035771 A1* | 2/2007 | Kitamaru | H04N 1/00238 358/1.18 |
| 2007/0036596 A1* | 2/2007 | Takahashi | B41J 29/38 399/381 |
| 2007/0146737 A1* | 6/2007 | Morimoto | H04N 1/3873 358/1.2 |
| 2007/0146819 A1* | 6/2007 | Kai | H04N 1/00737 358/474 |
| 2007/0285697 A1* | 12/2007 | Ebina | B41L 13/06 358/1.12 |
| 2008/0231870 A1* | 9/2008 | Sasaki | H04N 1/00482 358/1.5 |
| 2010/0245906 A1* | 9/2010 | Nitta | H04N 1/00442 358/1.15 |
| 2011/0145085 A1* | 6/2011 | Khachatrian | G06Q 30/018 705/26.1 |
| 2011/0255131 A1* | 10/2011 | Inoue | G03G 15/36 358/1.15 |
| 2013/0163846 A1* | 6/2013 | Cooper | H04N 1/3878 382/137 |
| 2014/0078522 A1* | 3/2014 | Hiraki | H04N 1/393 358/1.2 |
| 2018/0077309 A1* | 3/2018 | Saitoh | H04N 1/00816 |

FOREIGN PATENT DOCUMENTS

| | | |
|---|---|---|
| JP | 2004-248262 A | 9/2004 |
| JP | 2011-055131 A | 3/2011 |

* cited by examiner

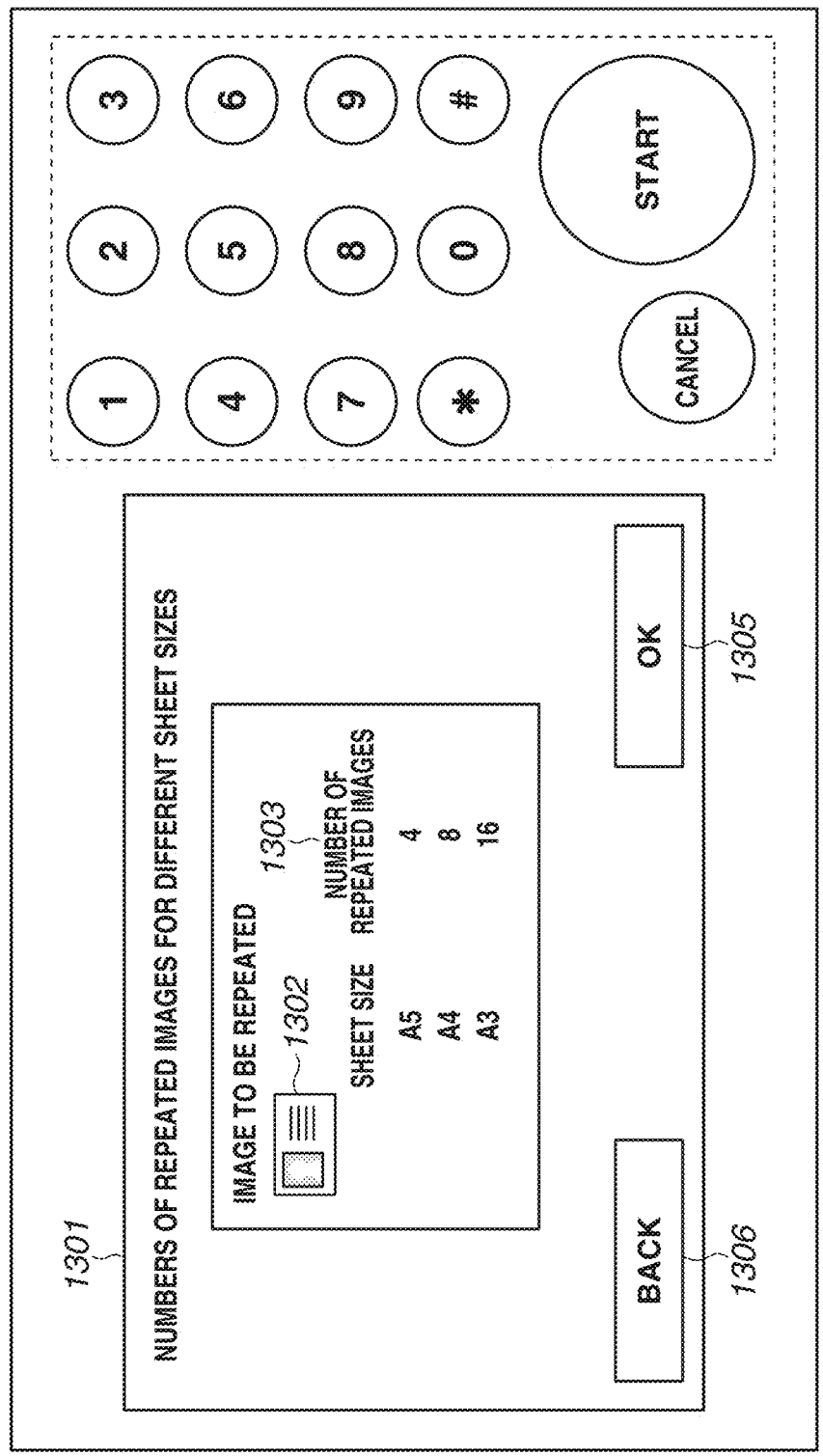

IMAGE PROCESSING APPARATUS, IMAGE PROCESSING METHOD, AND STORAGE MEDIUM

BACKGROUND

Field of the Disclosure

The present disclosure generally relates to image processing and, more particularly, to an image processing apparatus, an image processing method, a storage medium, and image repeat processing for determining a part of a document image included in a scan image as a repeat target image, repeatedly laying out the repeat target image within a recording sheet, and printing the laid-out repeat target images.

Description of the Related Art

Some image forming apparatuses including copying machines and multifunction peripherals have an image repeat printing function. The image repeat printing function is a function of determining a part of an image of a document (document image) read by a scanner as the repeat target image, repeatedly laying out a repeat target image, and printing the resultant on a recording sheet.

Japanese Patent Application Laid-Open No. 2004-248262 discusses a technique for allowing a user to select whether to add margins between adjoining ones of repeatedly laid-out repeat target images and to set the number of repetitions in a vertical direction and the number of repetitions in a horizontal direction. If the numbers of repetitions in the vertical direction and the horizontal direction are specified by the user, the image forming apparatus determines whether the entire repeat target image can be recorded within a previously-selected recording sheet as many times as the specified numbers of repetitions. If the repeat target images are unable to be recorded, the repeat target images are cropped for layout.

Japanese Patent Application Laid-Open No. 07-261599 discusses automatically changing the magnification of an image to be repeated and laying out the resulting image within a previously-specified sheet size if the user sets the number of repetitions, in such a manner that as many images to be repeated as the set number of repetitions fit to the sheet size.

According to the foregoing techniques, if as many repeat target images as the number(s) of repetitions specified by the user are unable to be laid out within a sheet selected in advance, the repeat target images are cropped or reduced in size with reference to the sheet size of the sheet.

There is a user demand for a print product on which a repeat target image is repeatedly printed as many times as the user needs, without cropping or reducing the repeat target images. However, there has been an issue that the user has difficulty in finding out what size of sheet is appropriate to select for the image repeat processing.

SUMMARY

According to one or more aspects of the present disclosure, an image processing apparatus includes a memory that stores a program, and a processor that executes the program to perform: obtaining a tilt-corrected document image by performing image analysis processing on a scan image to detect a document area and performing extraction and tilt correction of a document image based on the detected document area, setting a repeat target area based on the obtained tilt-corrected document image, calculating a number of repetitions in repeatedly laying out the repeat target area for each of a plurality of candidate sheet sizes, and displaying a list screen showing the calculated numbers of repetitions for the respective plurality of candidate sheet sizes, generating a repeat layout-processed output image by repeatedly laying out an image of the repeat target area within a sheet size specified by a user, and executing print processing using the generated repeat layout-processed output image.

Further features of the present disclosure will become apparent from the following description of exemplary embodiments with reference to the attached drawings.

BRIEF DESCRIPTION OF THE DRAWINGS

FIG. 13 is a diagram illustrating an example of a screen presenting the numbers of repeated images by sheet size.

DESCRIPTION OF THE EMBODIMENTS

Various exemplary embodiments, aspects, and features of the present disclosure will be described in detail below with reference to the drawings. The components described in the exemplary embodiments are merely illustrative and not intended to limit the scope of the present disclosure.

System Configuration

Figure 1:
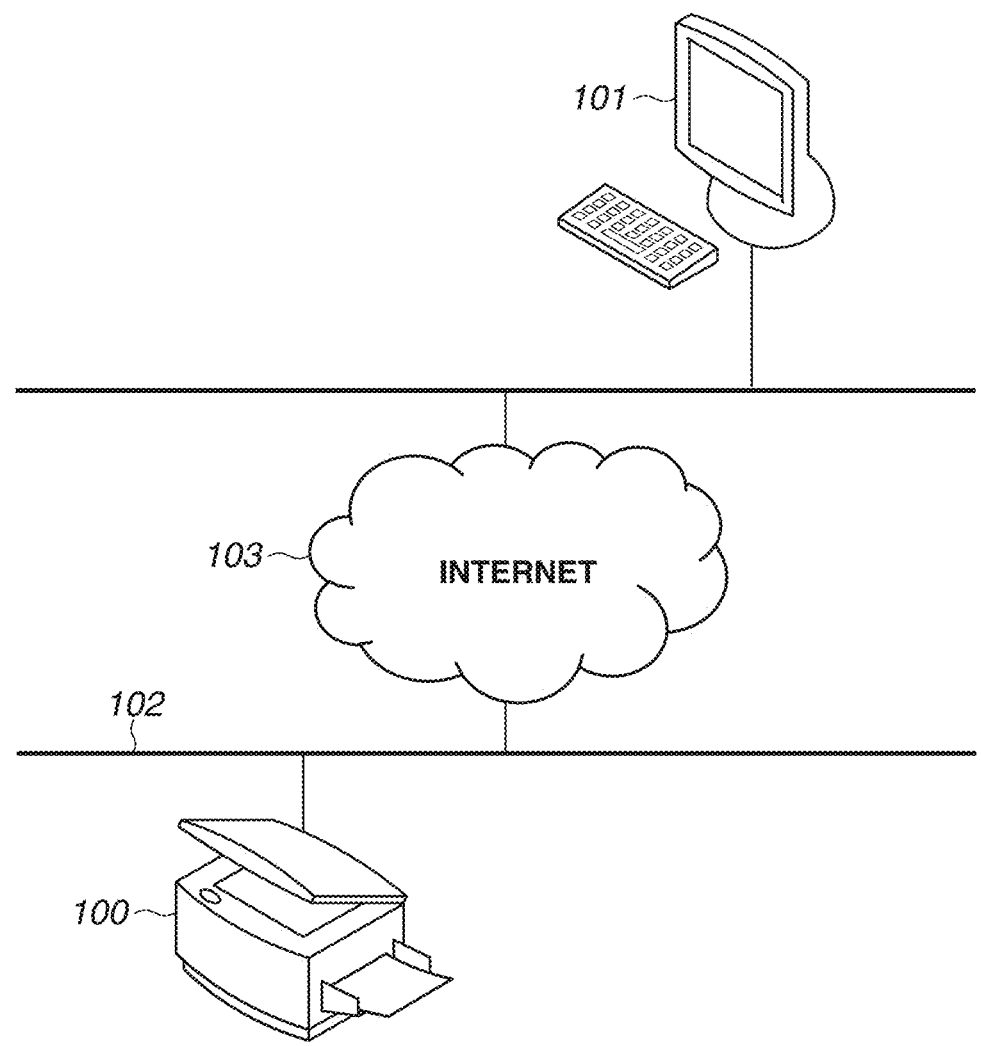
FIG. 1 is a diagram illustrating an overall configuration example of a system.

FIG. 1 is a diagram illustrating an overall configuration of a system to which a first exemplary embodiment can be applied. As illustrated in FIG. 1, an image forming apparatus (image processing apparatus) 100 is connected to a local area network (LAN) 102 and can communicate with a terminal 101, such as a personal computer (PC), via the Internet 103. The terminal 101, such as a PC, is not necessarily indispensable for implementing the present exemplary embodiment. The present exemplary embodiment may include the image forming apparatus 100 alone.

The image forming apparatus (image processing apparatus) 100 is a multifunction peripheral (MFP) including a display and operation unit, a scanner unit, and a printer unit. The image forming apparatus 100 can be used as a scan terminal that scans a document (such as a written document, a business card, an identification photo, a driver's license, a postcard, or the like) using the scanner unit. The display and operation unit includes a touch panel and hardware buttons. The display and operation unit displays a scan image, a preview image of a layout processing result, and a user interface for inputting instructions from the user. According to the present exemplary embodiment, repeat layout processing (also referred to as image repeat processing) for repeatedly laying out a processing target within an output document is performed using an image in an area automatically extracted or manually specified in a scan image as the processing target. A preview image of the layout processing result is displayed on-screen. If the user presses a print start button on the preview screen, the image forming apparatus 100 then performs print processing by using the printer unit.

According to the present exemplary embodiment, the image forming apparatus 100 is described to perform scan processing, the repeat layout processing, and the print processing on a standalone basis. However, the system may be configured in such a manner that part of the processing is performed by the other terminal 101. For example, the scan processing and the repeat layout processing may be performed by the image forming apparatus 100, and the image of the layout processing result may be transmitted to the other terminal 101 via the network and the other terminal 101 may print the image.

Hardware Configuration of Image Forming Apparatus 100

Figure 2:
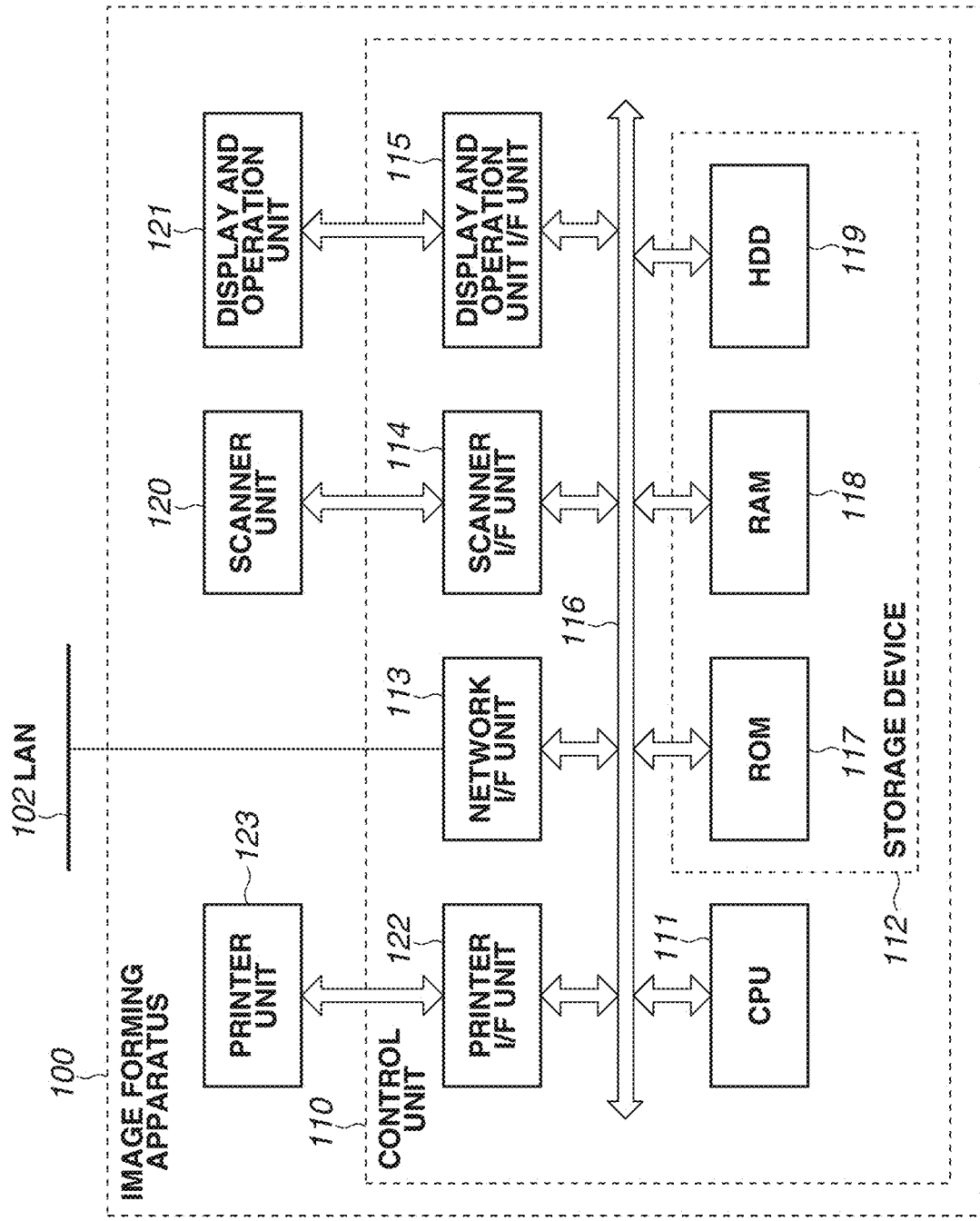
FIG. 2 is a diagram illustrating a hardware configuration example of an image forming apparatus.

FIG. 2 is a block diagram illustrating a configuration of the image forming apparatus 100. A control unit 110 includes a central processing unit (CPU) 111, a storage device 112 (a read-only memory (ROM) 117, a random access memory (RAM) 118, and a hard disk drive (HDD) 119), a network interface (I/F) unit 113, a scanner I/F unit 114, a display and operation unit I/F unit 115, and a printer I/F unit 122, which are connected via a system bus 116 to communicate with each other. The control unit 110 controls operation of the entire image forming apparatus 100.

The CPU 111, which may include one or more processors, one or more memories, circuitry, or a combination thereof, may function as a unit for executing various types of processing (such as a read control, display control, and print control) in a flowchart to be described below by reading a control program stored in the storage device 112 and executing the control program. The storage device 112 stores and retains the foregoing control program, image data, metadata, setting data, and processing result data. The storage device 112 includes the ROM 117 which is a nonvolatile memory, the RAM 118 which is a volatile memory, and the HDD 119 which is a large-capacity storage area. The ROM 117 is a nonvolatile memory storing the control program. The CPU 111 reads the control program and performs control. The RAM 118 is a volatile memory used as temporary storage areas such as a main memory and a work area of the CPU 111.

The network I/F unit 113 connects the control unit 110 (image forming apparatus 100) to the LAN 102 via the system bus 116. The network I/F unit 113 transmits image data to an external apparatus on the LAN 102, and receives various types of information from an external apparatus on the LAN 102.

The scanner I/F unit 114 connects a scanner unit 120 and the control unit 110 via the system bus 116. The scanner unit 120 reads an image on a document to generate scan image data, and inputs the scan image data to the control unit 110 via the scanner I/F unit 114.

The display and operation unit I/F unit 115 connects a display and operation unit 121 and the control unit 110 via the system bus 116. The display and control unit 121 includes a liquid crystal display unit having a touch panel function, and a keyboard.

The printer I/F unit 122 connects a printer unit 123 and the control unit 110 via the system bus 116. The printer unit 123 receives layout-processed image data generated by the CPU 111 via the printer I/F unit 122, and performs print processing on a recording sheet using the received image data.

As described above, the image forming apparatus 100 according to the present exemplary embodiment can provide image processing functions by using the foregoing hardware configuration.

Image Repeat Processing Function

The image repeat processing (repeat layout processing) will be described as an image processing function according to the present exemplary embodiment.

The image forming apparatus 100 scans a document placed on a platen of the scanner unit 120 to obtain a scan image. The image forming apparatus 100 obtains a tilt-corrected document image by detection of the document area and extraction and tilt correction of the document area which are performed by executing image analysis processing on the obtained scan image. Details of the processing for detecting the document area will be described below.

The image forming apparatus 100 determines a layout in which the tilt-corrected document image is repeatedly laid out in an output image corresponding to a specified sheet size. The image forming apparatus 100 then generates an image repeat processing result image by laying out the document image based on the determined layout, and displays a preview image on the user interface (UI) of the display and operation unit. The image forming apparatus 100 can accept print instructions for the image repeat processing result image from the user via the display and operation unit 121.

Figure 3:
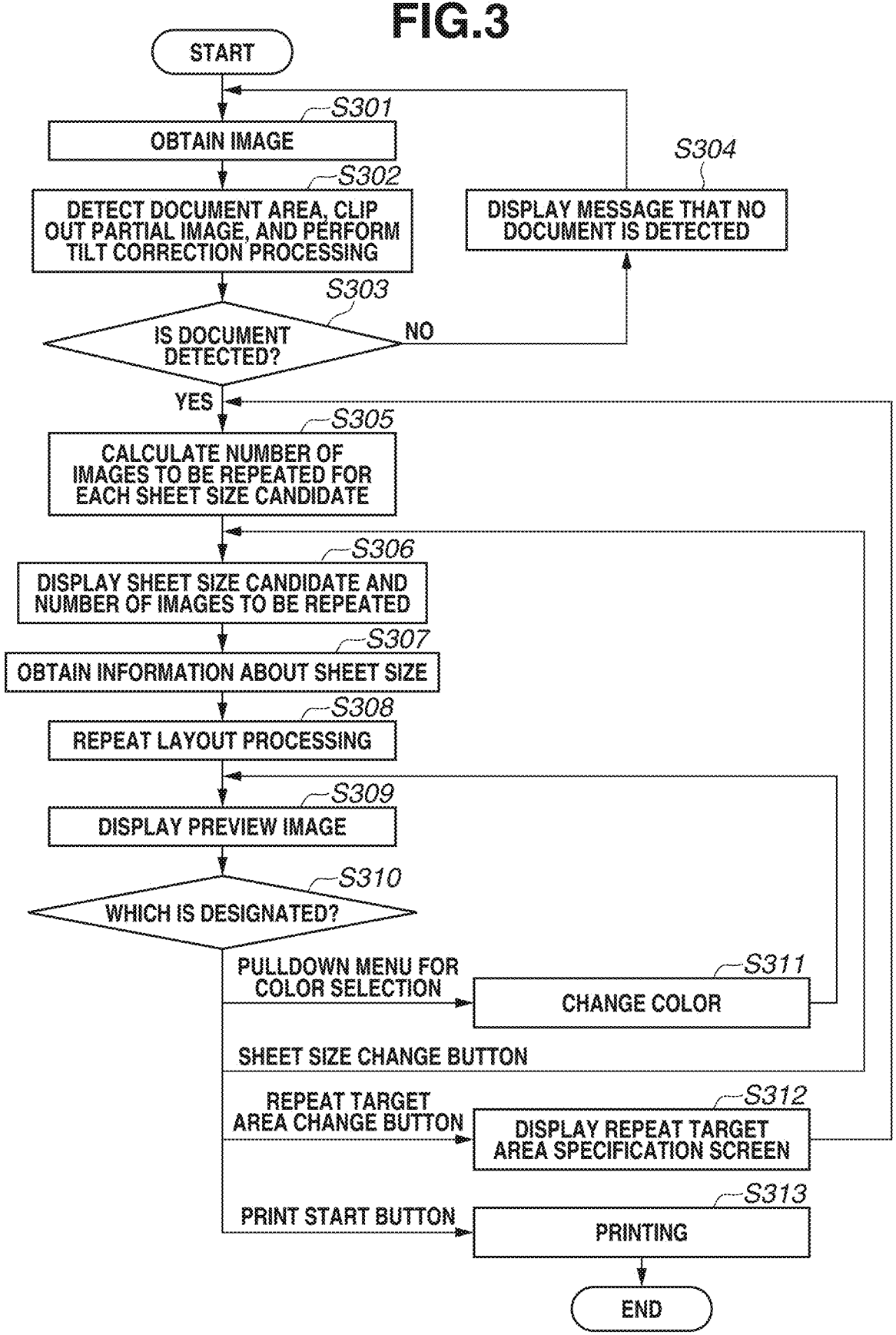
FIG. 3 is a flowchart related to image repeat processing according to a first exemplary embodiment.
Figure 4:
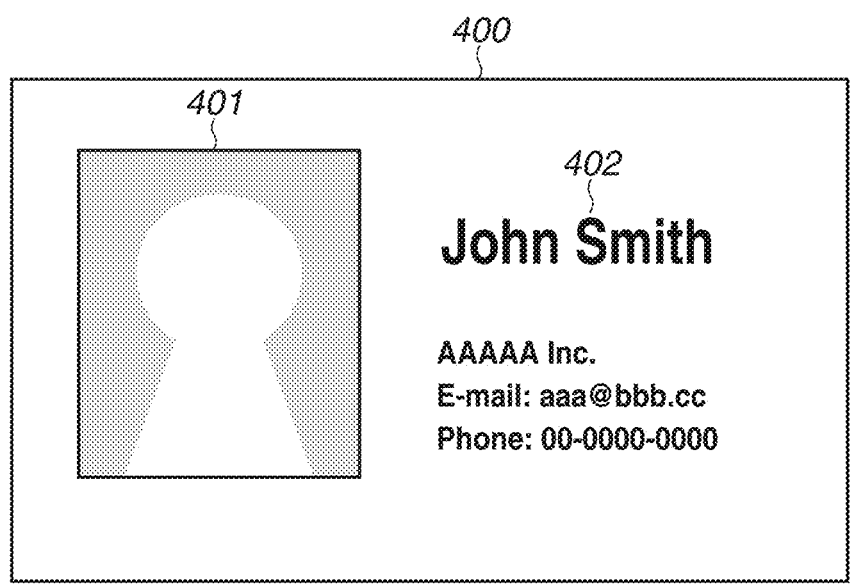
FIG. 4 is a diagram illustrating an example of a document to be scanned.

FIG. 3 is a flowchart illustrating details of the image repeat processing according to the first exemplary embodiment. The CPU 111 of the image forming apparatus 100 loads a processing program stored in the ROM 117 into the RAM 118 and executes the processing program to function as a processing unit that performs the processing of steps in FIG. 3. According to the present exemplary embodiment, a business card illustrated in FIG. 4 is scanned as a scan target document. However, the type of document is not limited to a business card. The document to be scanned may be a regular-sized or irregular-sized document, a driver's license, an identification photo, various types of cards, or a postcard.

Figure 6:
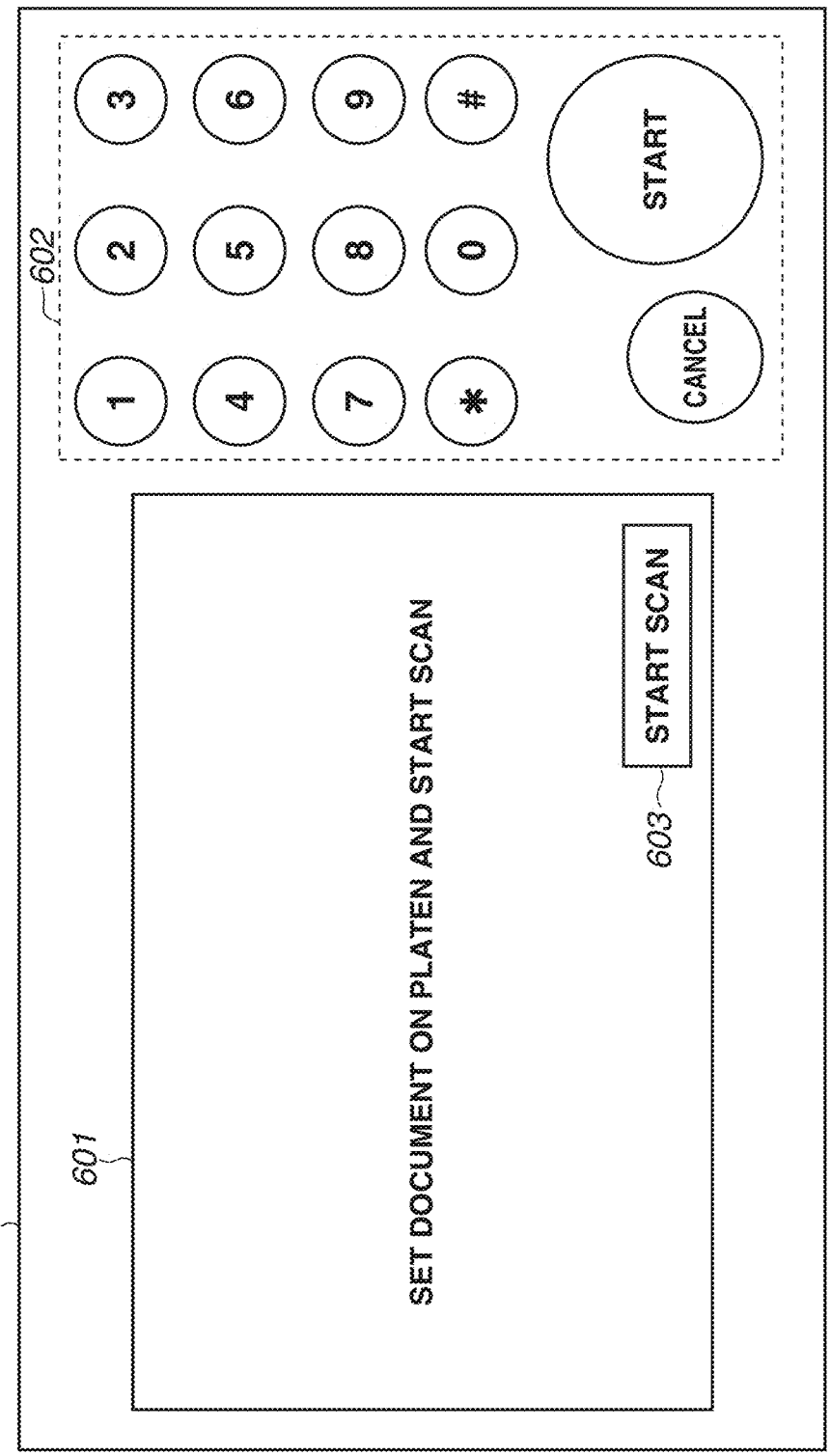
FIG. 6 is a diagram illustrating an example of an operation screen.

When the user specifies an image repeat processing mode on an operation screen of the image forming apparatus 100, an operation screen is displayed on a touch panel display area 601 of FIG. 6. In FIG. 6, the display and control unit 121 includes the touch panel display area 601 and hardware keys 602 (including numeric keys and a start key for various types of processing). The touch panel display area 601 displays a message for prompting the user to set a document on the platen and start a scan, and a scan start button (software key) 603 for issuing an instruction to start a scan.

Figure 5:
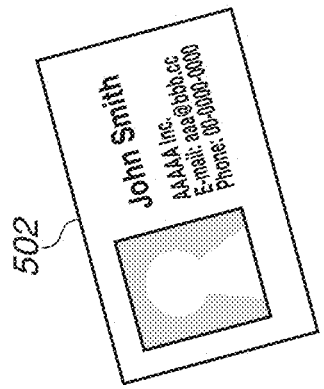
FIG. 5 is a diagram illustrating an example of an image that is obtained as a result of reading a document placed on a platen and has the same size as that of the platen.

When the scan start button 603 is selected by the user, then in step S301, the CPU 111 of the image forming apparatus 100 operates the scanner unit 120 to perform processing for obtaining an image. In a case where a business card or irregular-sized document such as illustrated in FIG. 4 is placed on the platen and scanned, automatic detection of document size by a document size detection sensor sometimes fails. In the image repeat processing according to the present exemplary embodiment, the entire platen is then determined as the read target, and a scan image having the same size as that of the platen is obtained. FIG. 4 is a diagram illustrating an example of a business card (document) 400. The business card 400 includes an area 401 including a photo and an area 402 including character strings, such as name and address. According to the present exemplary embodiment, the business card 400 is placed on the platen and scanned, and a scan image 501 illustrated in FIG. 5 is obtained. If the business card 400 is carelessly placed on the platen, the business card 400 is scanned with a tilt to the platen. The resulting scan image 501 then includes a tilted business card image 502.

In step S302, the CPU 111 detects a document area by performing image analysis processing (document area detection processing) on the image obtained in step S301, clips out a partial image of the detected document area, and performs tilt correction processing. Thus, the CPU 111 can clip the area of the business card image 502 from the scan image 501 obtained in step S301 and obtain a tilt-corrected image. The processing for detecting the document area and the tilt correction processing can be implemented using conventional methods. For example, to detect a document area from a scan image, the CPU 111 can use a conventional technique for determining an edge-enhanced image by application of a Sobel filter to the scan image and detecting portions where pixels of high edge intensity are linearly arranged as the sides of the document. The CPU 111 then identifies four vertexes based on the detected four sides of the document, and clips out an image of the document area (i.e., extracts a document image from the scan image) based on the identified four vertexes. In a case where the image of the document area clipped from the scan image is tilted, the CPU 111 further performs tilt correction to obtain a tilt-corrected document image. For the tilt correction, for example, the CPU 111 may estimate the tilt angle based on the coordinate values of the identified four vertexes, and rotate the image in a direction to correct the tilt angle. The processing for clipping out the image of the document area (processing for extracting the document image) and the tilt correction processing may be executed in succession. The clipping and the tilt correction may be performed at the same time. For example, the CPU 111 can simultaneously implement the extraction of pixels in a rectangular area surrounded by the four vertexes and the tilt correction by performing predetermined projective transformation processing on the pixels in the rectangular area based on the coordinate values of the four vertexes.

In step S303, the CPU 111 determines whether a document is detected, based on the result of the document area detection processing in step S302. If the CPU 111 determines that there is no document determined (NO in step S303), the processing proceeds to step S304. In step S304, the CPU 111 displays a message that no document is detected and a message for prompting the user to place the document on the platen again and perform a scan again on the display and operation unit 121. In step S303, if the CPU 111 determines that there is a document detected (YES in step S303), the processing proceeds to step S305.

In step S305, the CPU 111 obtains candidate sheet sizes (for example, the sheet sizes of sheets stored in a respective plurality of sheet feed stages (such as A3, A4, and A5)). The CPU 111 then determines the positions of repeat target images in repeatedly laying out the repeat target image for each of the candidate sheet sizes, and calculates how many repeat target images can be laid out for each candidate sheet size. The clipped image (tilt-corrected partial document image) obtained as a result of the document area detection processing and the tilt correction processing in step S302 is initially set as the repeat target image. The candidate sheet sizes are not limited to the sheet sizes of the sheets in the sheet feed stages. Predetermined sheet sizes may be used as calculation targets. To calculate the number of repeat target images (number of repetitions) for each candidate sheet size, the CPU 111 initially calculates how many images can be laid out if the repeat target image is laid out from the top left of the candidate sheet size, based on the vertical and horizontal sizes of the candidate sheet size and the size of the repeat target image. The CPU 111 then calculates how many images can be laid out if the repeat target image is rotated by 90° and laid out from the top left of the candidate sheet size. The CPU 111 can then compare the numbers of images laid out with and without the 90° rotation, and use the greater as the number of repeated images (number of repetitions) for the candidate sheet size. The CPU 111 may be configured to temporarily store information about the calculated layout positions in laying out the repeat target image for each candidate sheet size. In such a case, the information can be used in the processing of step S308 to be described below.

In step S306, the CPU 111 displays the number of repeated images (number of repetitions) calculated for each candidate sheet size in step S305 on the display and operation unit 121. FIG. 13 illustrates a display example of the numbers of repeated images for respective candidate sheet sizes. A touch panel display area 1301 of the display and operation unit 121 displays a preview 1302 of the repeat target image and information 1303 about the numbers of repeated images calculated for the respective candidate sheet sizes in step S305. By referring to the numbers of repeated images (number of repetitions) presented for the respective candidate sheet sizes, the user can easily find out which sheet size can be selected to obtain a desired number of repeated images (desired number of repetitions). If the user selects a desired sheet size from among the displayed candidate sheet sizes and presses an OK button 1305, the CPU 111 determines that the selected sheet size is specified by the user. The processing then proceeds to step S307. If the user presses a back button 1306, the screen returns to the scan start screen of FIG. 6.

In step S307, the CPU 111 obtains information about the sheet size selected in step S306. If the user presses the OK button 1305 in step S306 without selecting a candidate sheet size, the reason seems to be that a desired sheet size is not included among the candidate sheet sizes. In such a case, the CPU 111 displays a screen for allowing the user manually specify the sheet size, and obtains the information about the sheet size specified on the screen.

In step S308, the CPU 111 executes repeat layout processing based on the repeat target image and the information about the sheet size obtained in step S307. In this processing, the CPU 111 determines whether information about layout positions in laying out the repeat target image for the sheet size obtained in step S307 is temporarily stored in step S305. If the information about the layout positions is stored, the CPU 111 obtains the information about the layout positions. If the information about the layout positions is not stored, the CPU 111 calculates the positions (layout positions) to repeatedly lay out the repeat target image at within the output sheet, based on the size of the repeat target image and the information about the sheet size obtained in step S307. The method for calculating the layout positions is similar to that described in step S305. The CPU 111 then generates a repeat-processed image (i.e., output image to be used for print processing) by repeatedly laying out the repeat target image at the obtained or calculated layout positions. The CPU 111 may be configured to not temporarily store the information about the layout positions when calculating the number of repeat target images that can be laid out in step S305, and always calculate the layout again in step S308.

Figure 7:
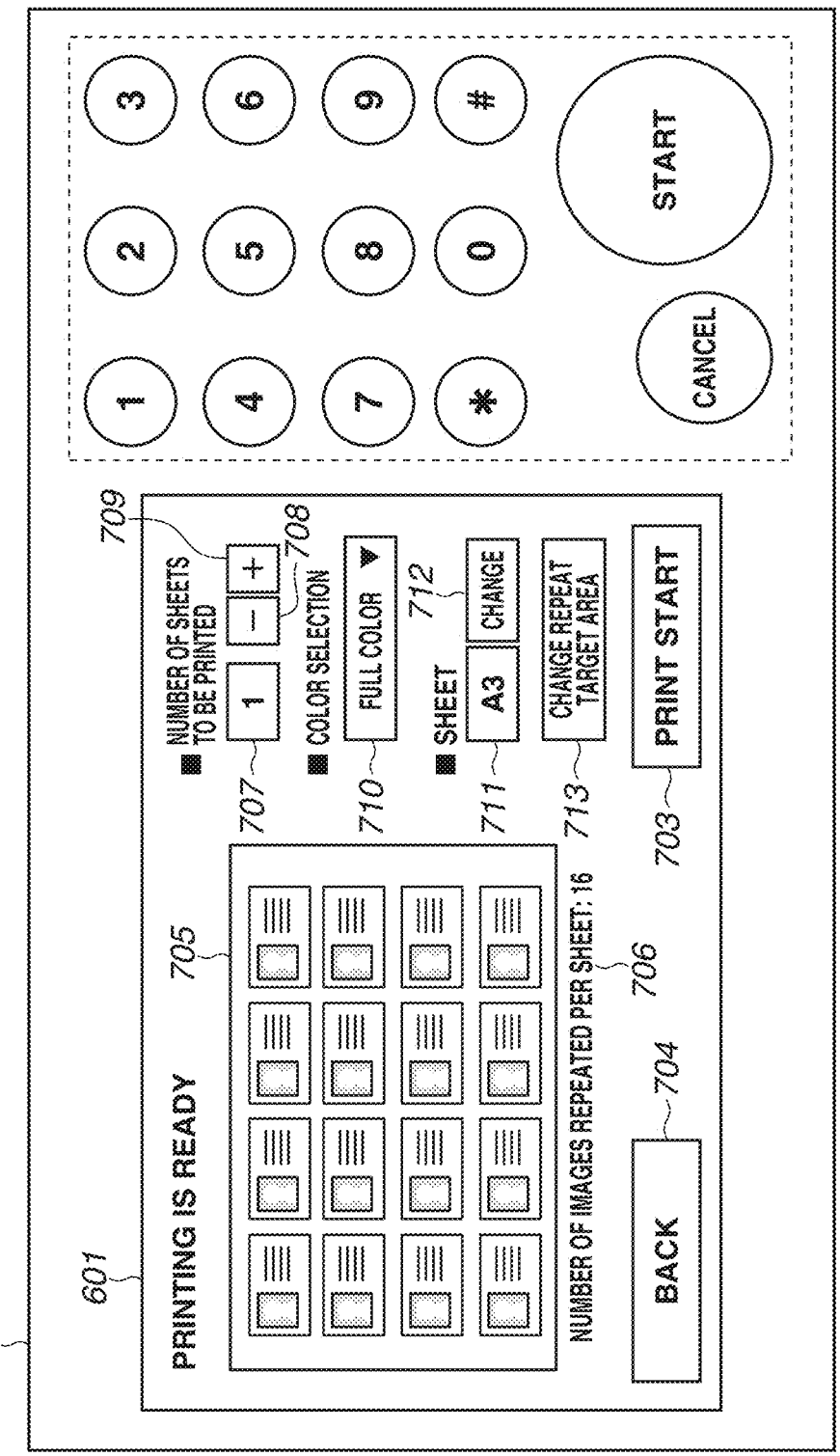
FIG. 7 is a diagram illustrating an example of a preview screen that provides a preview of an image obtained by executing the image repeat processing (repeat layout processing).

In step S309, the CPU 111 generates a preview image of the output image generated in step S308, and displays the preview image on a preview screen of the display and operation unit 121. The preview screen displayed on the display and operation unit 121 will be described with reference to FIG. 7. In FIG. 7, the display contents displayed in the touch panel display area 601 of FIG. 6 have changed to the preview screen of the output image.

In FIG. 7, a preview image 705 of the output image generated in step S308 is displayed. Image number information 706 is further displayed to indicate how many repeat target images are laid out in the output image generated in step S308. In the example of FIG. 7, 16 repeat target images are illustrated within a single output image.

A number of sheets to be printed 707 displays a numeral indicating the number of sheets for the output image to be printed on. When the user presses a plus button 709, the number of sheets to be printed 707 increases. When the user presses a minus button 708, the number of sheets to be printed 707 decreases. The number of sheets to be printed 707 may be increased or decreased by one each time the plus button 709 or the minus button 708 is clicked on. The number of sheets to be printed 707 may be continuously changed while the plus button 709 or the minus button 708 is long-pressed. The number of sheets to be printed 707 may be input by using the hardware keys 702.

A pulldown menu 710 is capable of selecting whether to print the output image in color or in monochrome. By default setting, "full color" is automatically selected if the repeat target image is a color image. "Monochrome" is automatically selected if the repeat target image is a monochrome image. The user can change the setting about the full-color printing/monochrome printing by a manual operation using the pulldown 710 for color selection. As will be described below in step S309, in a case where the setting about the full-color printing/monochrome printing is changed, the preview image 705 is also changed based on the changed setting. For example, if, in a state where full color is automatically selected, the user changes the setting to monochrome, the preview image 705 is also changed to a monochrome preview image accordingly.

A sheet size 711 displays the currently-set sheet size. If the user presses a sheet size change button 712, as will be described below in step S311, the CPU 111 performs sheet size change processing. If the sheet size is changed, the CPU 111 executes the repeat layout processing of step S306 to generate an output image again based on the changed sheet size and the size of the repeat target image, and updates the preview image 705 of the output image and the image number information 706.

Figure 9:
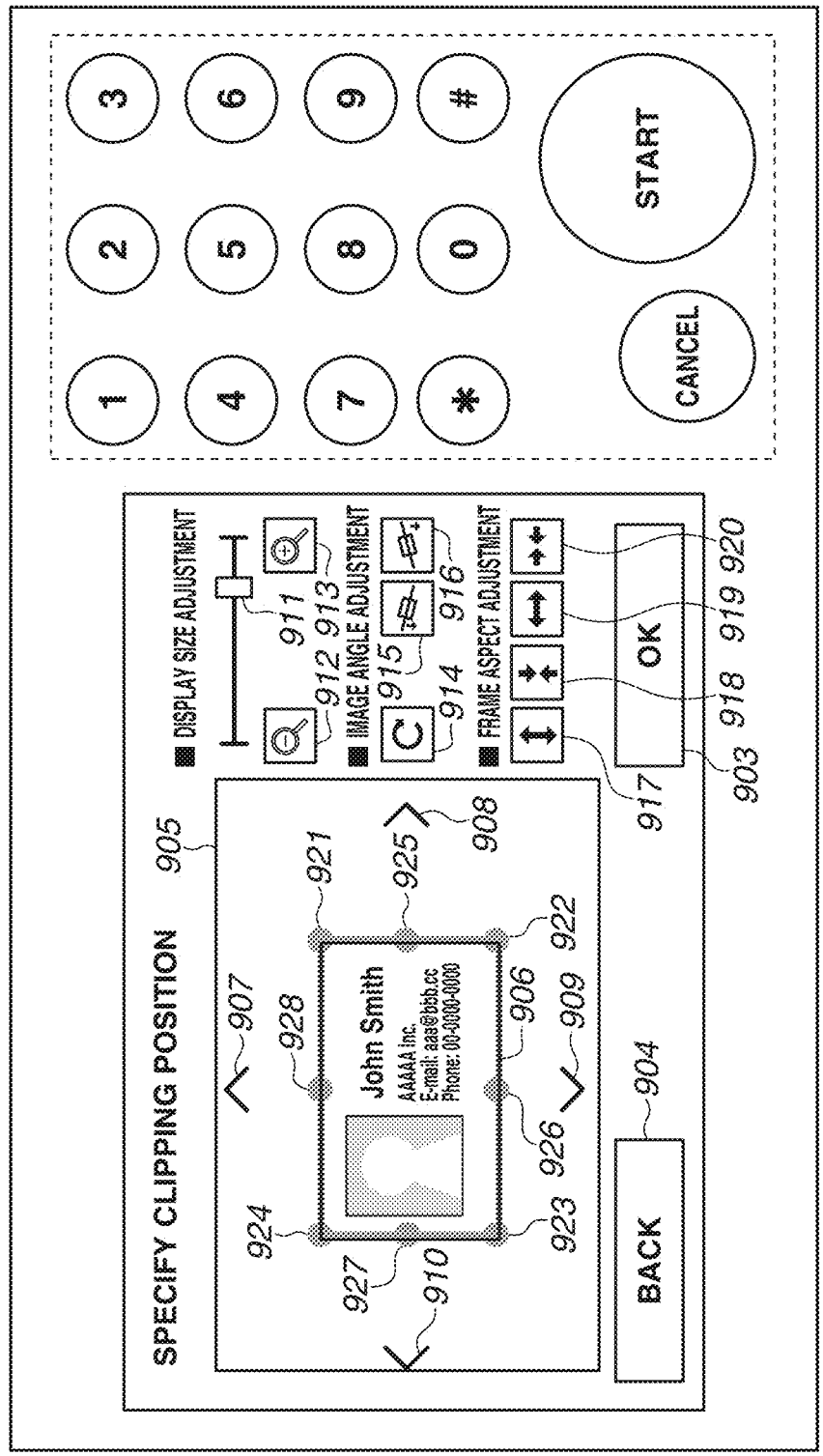
FIG. 9 is a diagram illustrating an example of a default display of a repeat target area specification screen.

If the user presses a repeat target area change button 713, the CPU 111 displays a repeat target area specification screen illustrated in FIG. 9, on which the user can modify the repeat target area into an area having a desired position and size. Details of the repeat target area specification screen in FIG. 9 will be described below in step S312.

If the user presses a print start button 703, as will be described in step S312 below, the CPU 111 starts print processing based on the current settings. If the user presses a back button 704, the screen returns to the screen illustrated in FIG. 13.

In step S310, the CPU 111 determines which of the buttons and pulldown menu displayed on the preview screen of FIG. 7 is designated by the user. If the CPU 111 determines that the pulldown menu 710 for color selection is designated (PULLDOWN MENU FOR COLOR SELECTION in step S310), the processing proceeds to step S311. If the sheet size change button 712 is determined to be designated (SHEET SIZE CHANGE BUTTON in step S310), the processing returns to step S306. If the CPU 111 determines that the repeat target area change button 713 is designated (REPEAT TARGET AREA CHANGE BUTTON in step S310), the processing proceeds to step S312. If the CPU 111 determines that the print start button 703 is designated (PRINT START BUTTON in step S310), the processing proceeds to step S313.

If, in step S310, the CPU 111 determines that the user's instruction is to change the setting about the full-color printing/monochrome printing by the pulldown menu 710 for color selection (PULLDOWN MENU FOR COLOR SELECTION in step S310), the processing proceeds to step S311. In step S311, the CPU 111 updates the display of the pulldown menu 710 based on the changed setting. The processing returns to step S309. In step S309, the CPU 111 also updates the preview image 705 based on the changed setting. For example, if the full color printing is being set and the setting is changed to the monochrome printing by the pulldown menu 710, then in step S309, the CPU 111 generates a monochrome preview image and updates the display of the preview screen. The timing of generation of a monochrome preview image and a monochrome output image is not limited to when the setting is changed to the monochrome printing by the pulldown menu 710. For example, both a color preview image and a monochrome preview image may be generated in advance when a preview image is generated for the first time based on the output image that is generated by the repeat layout processing of step S308 based on the image clipped out in step S302.

If, in step S310, the CPU 111 determines that the user's instruction is given by pressing the sheet size change button 712 (SHEET SIZE CHANGE BUTTON in step S310), the processing returns to step S306. In step S306, the CPU 111 presents a plurality of candidate sheet sizes (for example, regular sizes A3, A4, and A5) and the numbers of repeated images for the respective candidate sheet sizes as illustrated in FIG. 13, and determines a sheet size specified by the user from among the plurality of candidate sheet sizes. The method for changing the sheet size is not limited to selecting a sheet size from regular sizes. The user can be allowed to manually input an irregular sheet size (vertical and horizontal sizes of a sheet). If the sheet size is changed in step S306, then in step S307, the CPU 111 obtains the changed sheet size. In step S308, the CPU 111 executes the repeat layout processing based on the changed sheet size. In step S309, the CPU 111 displays a preview screen.

If, in step S310, the CPU 111 determines that the user's instruction is given by pressing the repeat target area change button 713 (REPEAT TARGET AREA CHANGE BUTTON in step S310), the processing proceeds to step S312. In step S312, the CPU 111 displays the repeat target area specification screen (FIG. 9) for changing the repeat target area on the touch panel display area.

Details of the repeat target area specification screen of FIG. 9 will be described. In FIG. 9, a display area 905 displays a preview image of a clipped image (tilt-corrected partial document image) obtained as a result of the document area detection processing and the tilt correction processing in step S302. A frame 906 indicating the position of the repeat target area at that point in time is displayed on the clipped image in a superimposed manner. The frame 906 indicating the position of the repeat target area can be displayed in lines of distinguishable color (for example, red). Before the repeat target area is changed based on the user's instructions, as illustrated in FIG. 9, the frame 906 is displayed with the partial document image detected and clipped out in step S302 as the repeat target area. Handlers (vertex handlers) 921, 922, 923, and 924 are displayed at the vertexes of the frame 906. The user can reduce and enlarge the repeat target area by changing the positions of the vertexes of the frame 906 by using the handlers 921, 922, 923, and 924. Handlers 925, 926, 927, and 928 are used by the user to change the positions of the sides of the frame 906. The user can also reduce and enlarge the repeat target area by operating the handlers 925, 926, 927, and 928. If any one of arrows 907, 908, 909, and 910 is pressed by the user, the displayed partial document image moves in the direction of the pressed arrow. In other words, the clipping position can also be adjusted to a user-desired clipping position by relatively moving the partial document image by using the arrows 907, 908, 909, and 910 without moving the position of the frame 906. The operations to move the partial document image are not limited to those on the arrows 907, 908, 909, and 910. The user can also be allowed to move the partial document image by performing a touch & drag operation on a position outside the frame 906 and inside the display area 905 of the preview image.

A bar 911 indicates the state of display magnification of the image displayed in the display area 905. The bar 911, when located to the right, indicates enlarged display. The bar 911, when located to the left, indicates reduced display. If the user presses a button 912, the image is displayed at a lower display magnification. If the user presses a button 913, the image is displayed at a higher display magnification. The display magnification can also be changed by directly dragging the bar 911 to the right or left. If the user presses a button 914, the display orientation of the image displayed in the display area 905 is rotated by 90°. If the user presses a button 915, the image displayed in the display area 905 is rotated counterclockwise in steps of 0.5°. If the user presses a button 916, the image displayed in the display area 905 is rotated clockwise in steps of 0.5°. According to the present exemplary embodiment, both the angles of rotation caused by the buttons 915 and 916 are described to be in steps of 0.5°. However, the steps are not limited to 0.5°. A button 917 is a button for issuing an instruction to vertically extend the frame 906. If the user presses the button 917, the position of the upper side of the frame 906 moves up by a predetermined number of pixels and the position of the lower side moves down by a predetermined number of pixels. A button 918 is a button for giving an instruction to vertically reduce the frame 906. If the user presses the button 918, the position of the upper side of the frame 906 moves down by a predetermined number of pixels and the position of the lower side moves up by a predetermined number of pixels. A button 919 is a button for issuing an instruction to horizontally extend the frame 906. A button 920 is a button for issuing an instruction to horizontally reduce the frame 906. If the user presses a button 904, the position of the frame 906 changed in FIG. 9 is cancelled, and the screen returns to that of FIG. 7.

Figure 10:
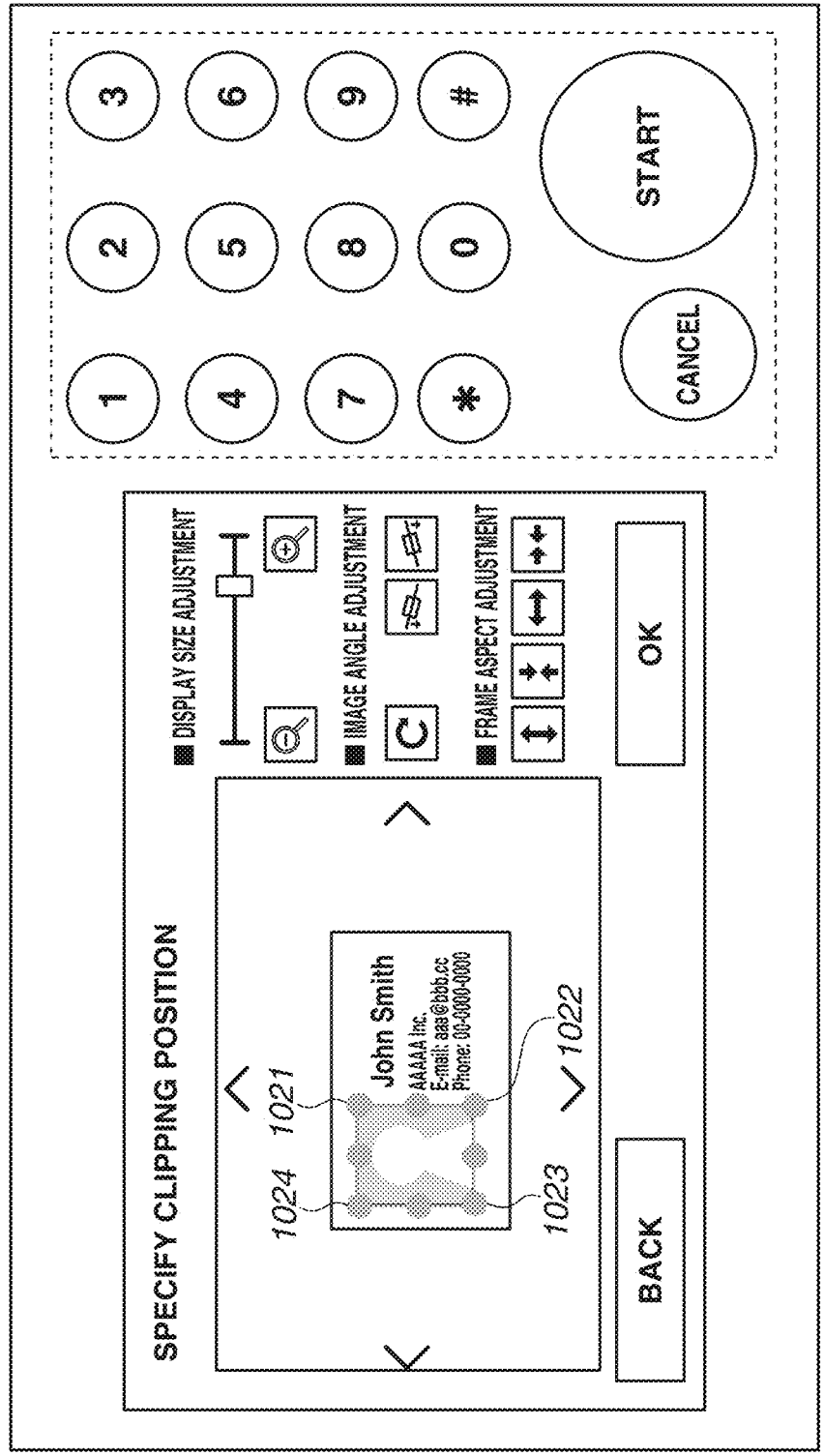
FIG. 10 is a diagram illustrating an example of a case where a position of a frame indicating a repeat target area is modified on the repeat target area specification screen.
Figure 11:
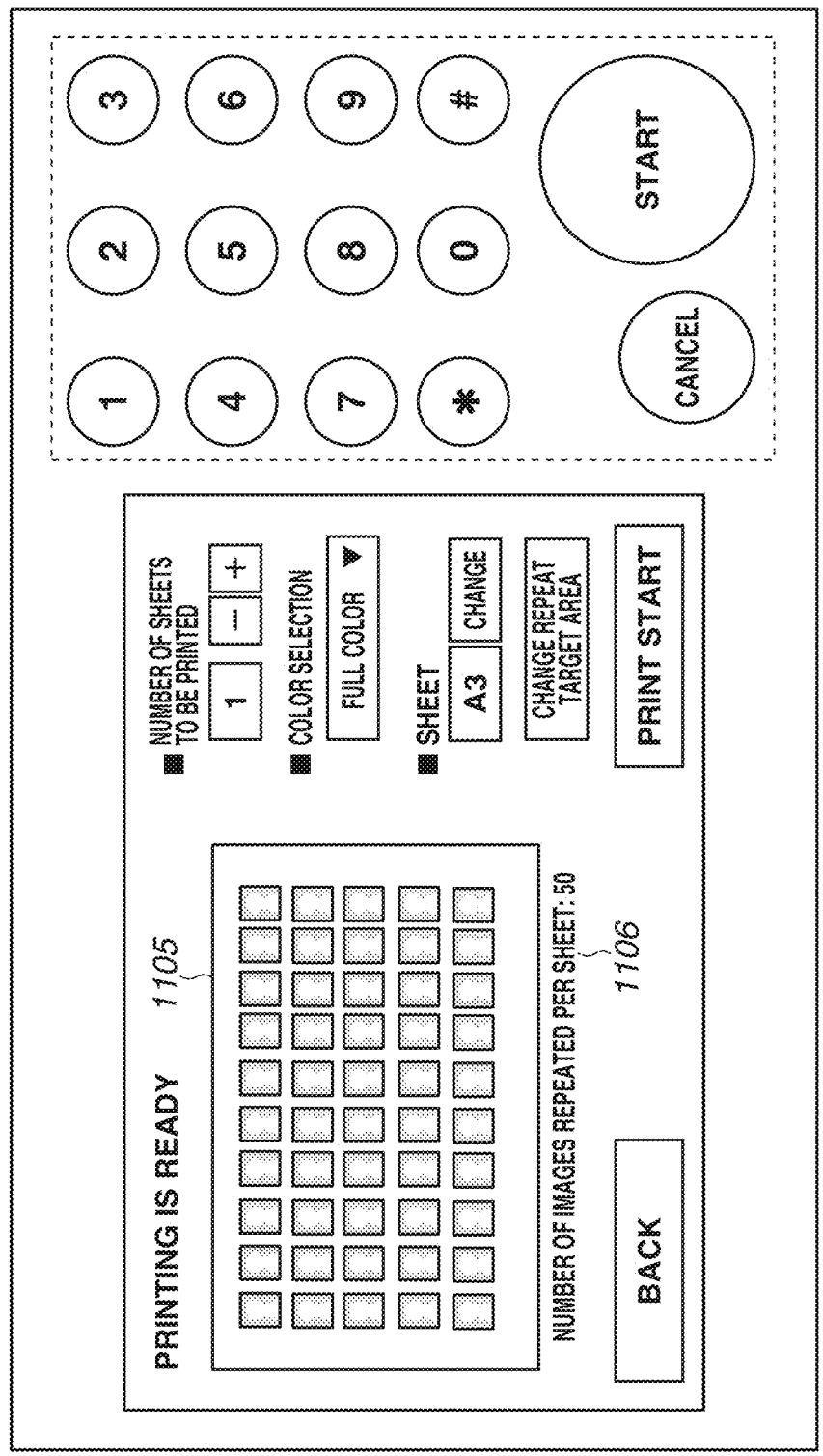
FIG. 11 is a diagram illustrating an example of a preview screen that provides a preview of an image obtained by executing the image repeat processing (repeat layout processing) after the position of the frame indicating the repeat target area is modified.

If the user presses a button 903, the CPU 111 determines the repeat target area based on the position of the frame 906 set at that point in time, and executes the processing for calculating the number of repeated images for each candidate sheet size in step S305 based on the image of the determined repeat target area. For example, the user wants to use only a photo area included in the business card image (document image) as the repeat target area. In such a case, the user adjusts the positions of the vertex handlers 921 to 924 of the frame 906 in FIG. 9 into those of vertex handlers 1021 to 1024 of the frame in FIG. 10. If the user presses the OK button in such a state, the area surrounded by the frame in FIG. 10 is determined as the repeat target area. In step S305, the CPU 111 executes the processing for calculating the number of repeated images for each candidate sheet size again. In step S306, the CPU 111 updates and displays the numbers of repeated images for the respective candidate sheet sizes. If the user then selects a desired sheet size, the CPU 111 performs the repeat layout processing of step S308 to obtain a new output image. In step S309, the CPU 111 displays a preview image of the output image on a preview screen 1105 as illustrated in FIG. 11. In FIG. 11, image number information 1106 is displayed to indicate how many images of the repeat target area changed in FIG. 10 are laid out for the selected sheet size.

According to the present exemplary embodiment, the repeat layout processing is described to be performed in such a manner that the images of the repeat target area are printed at a magnification of 100%. However, the magnification is not limited to 100%. For example, if the magnification of the image of the repeat target area can be specified in the screen of FIG. 9, the image repeat processing can be performed with the image of the repeat target area enlarged or reduced. The processing for calculating the number of repetitions of step S305 and the repeat layout processing of step S208 can then be executed in consideration of the specified magnification.

If, in step S310, the CPU 111 determines that the user's instruction is given by pressing the print start button 703 (PRINT START BUTTON in step S310), the processing proceeds to step S313. In step S313, the CPU 111 performs control in such a manner that the printer unit 123 performs printing using the output image generated in step S308.

According to the first exemplary embodiment, as illustrated in FIG. 13, the numbers of repeated images for the respective plurality of candidate sheet sizes are automatically presented. The user can thus easily find out which size of sheet is appropriately selected to obtain a print product on which the intended image is repeatedly printed as many times as needed.

The repeat target area specification screen of FIG. 9 displays the tilt-corrected partial document image obtained in step S302, not the scan image of the entire platen obtained in step S301. If the scan image of the entire platen is simply displayed for a preview, the business card image included in the scan image is displayed relatively small and the user has difficulty in specifying the area to be repeated. According to the present exemplary embodiment, the partial document image obtained in step S302 is displayed in a larger size, which facilitates the user specifying the area to be repeated. The display of the tilt-corrected partial document image also facilitates the user accurately specifying the area to be repeated. Even if a document is obliquely placed and scanned on the platen, the tilt correction in step S302 eliminates the need for the user to take care not to tilt the document when placing the document on the platen.

The preview screen of FIG. 7 displayed in step S309 initially displays the preview screen of the output image that is generated by setting the tilt-corrected partial document image obtained in step S302 as an initial repeat target image and executing the repeat layout processing of step S306. The user therefore only needs to press the print start button 703 if the settings are acceptable. The repeat layout processing can thus be executed easily.

According to the first exemplary embodiment, the processing of steps S301 to S306 in FIG. 3 is described to be executed to display the list screen showing the numbers of repeated images by sheet size of FIG. 13 if the user presses the scan start button 603 on the operation screen of FIG. 6. According to a second exemplary embodiment, if the user presses the scan start button 603 on the operation screen of FIG. 6, the repeat target area specification screen of FIG. 9 is displayed to allow the user to check and/or modify the repeat target area before the list screen showing the numbers of repeated images by sheet size of FIG. 13 is displayed.

Figure 8:
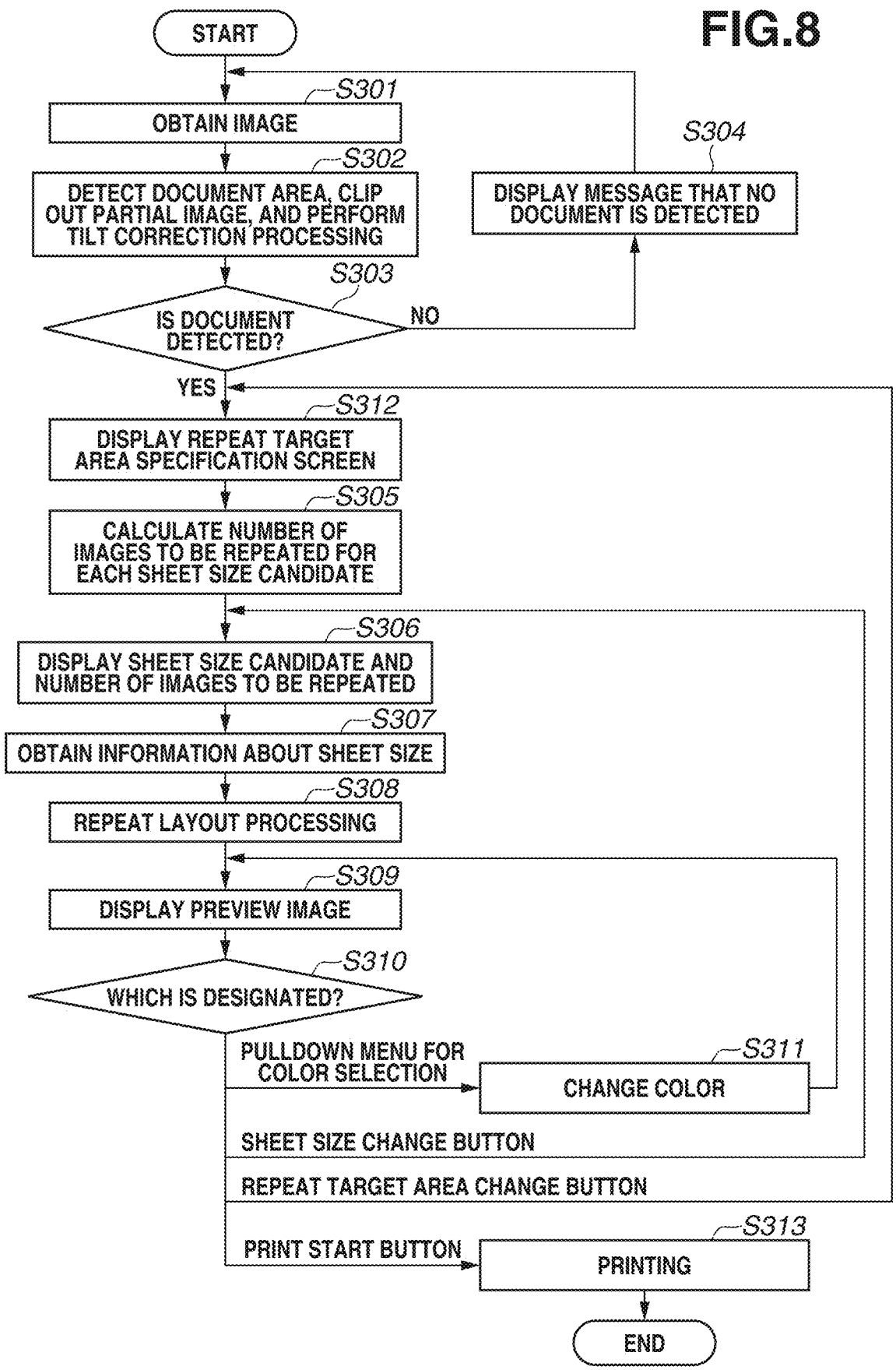
FIG. 8 is a flowchart related to image repeat processing according to a second exemplary embodiment.

FIG. 8 is a flowchart illustrating details of image repeat processing according to the second exemplary embodiment. Differences between the flowchart of the second exemplary embodiment illustrated in FIG. 8 and the flowchart of the first exemplary embodiment illustrated in FIG. 3 will be described. According to the second exemplary embodiment, if, in step S303 of FIG. 8, the CPU 111 determines that a document is detected (YES in step S303), the processing proceeds to step S312. In step S312, the CPU 111 displays the repeat target area specification screen of FIG. 9. After the repeat target area is determined on the repeat target area specification screen of FIG. 9, the CPU 111 performs the processing of steps S305 and S306 to display the list screen showing the numbers of repeated images by sheet size.

Details of the processing of the steps are similar to those of the processing of the corresponding step numbers in the first exemplary embodiment. A description thereof will thus be omitted.

As described above, according to the second exemplary embodiment, the repeat target area specification screen of FIG. 9 is displayed before the list screen showing the numbers of repeated images by sheet size of FIG. 13 and the preview screen of FIG. 7 are displayed. The user can thus check the repeat target area in advance, and can easily modify the repeat target area if needed. Like the first exemplary embodiment, the repeat target area specification screen of FIG. 9 displays not the scan image of the entire platen obtained in step S301 but the tilt-corrected partial document image obtained in step S302. This facilitates the user accurately specifying the repeat target area.

According to the first exemplary embedment, the list screen showing the numbers of repeated images by sheet size of FIG. 13 is described to be first displayed in the touch panel display area after the user presses the scan start button 603 on the operation screen of FIG. 6. According to the second exemplary embodiment, the repeat target area specification screen of FIG. 9 is described to be first displayed. According to a third exemplary embodiment, whether to display the list screen showing the numbers of repeated images by sheet size of FIG. 13 first or the repeat target area specification screen of FIG. 9 first is adaptively changed based on the scanned document.

Figure 12:
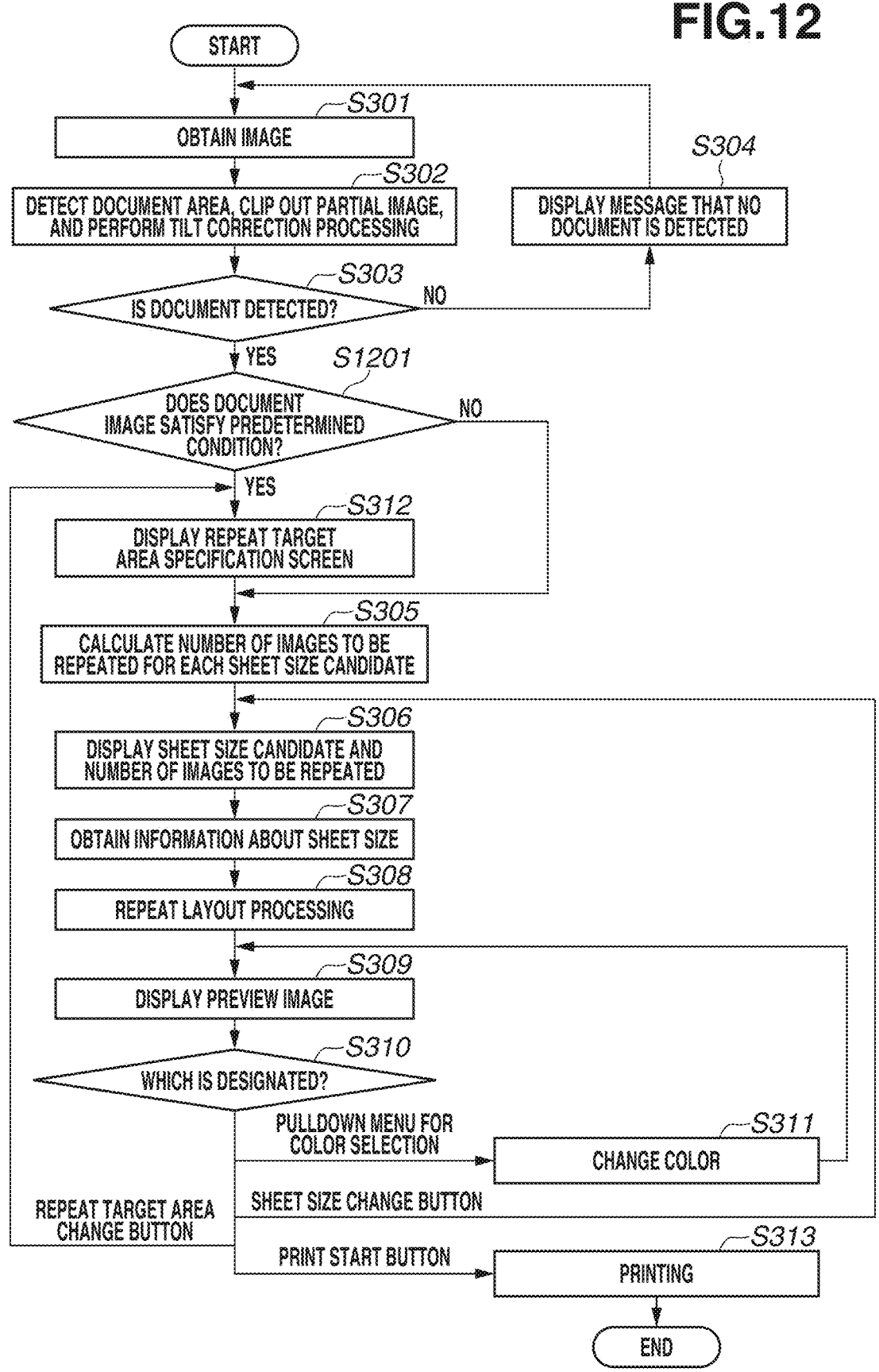
FIG. 12 is a flowchart related to image repeat processing according to a third exemplary embodiment.

Details of image repeat processing according to the third exemplary embodiment will be described with reference to the flowchart of FIG. 12. In FIG. 12, if, in step S303, the CPU 111 determines that a document is detected (YES in step S303), the processing proceeds to step S1201. In step S1201, the CPU 111 determines whether the document image detected in step S302 satisfies a predetermined condition. In step S1201, if the CPU 111 determines that the document image satisfies the predetermined condition (YES in step S1201), the processing proceeds to step S312. In step S312, the CPU 111 displays the repeat target area specification screen of FIG. 9. On the other hand, if, in step S1201, the CPU 111 determines that the document image satisfies the predetermined condition (NO in step S1201), the processing proceeds to step S305. The CPU 111 performs the processing of steps S305 and S306 to display the list screen showing the numbers of repeated images by sheet size of FIG. 13.

An example of the predetermined condition used for the determination in step S1201 is whether the document image detected in step S302 has a size greater than a predetermined size (for example, A4 size). If the size of the document image is greater, part of the document is likely to be clipped out and used as a repeat target. The processing then proceeds to step S312, and the CPU 111 displays the repeat target area specification screen of FIG. 9.

Another example of the predetermined condition used for the determination in step S1201 will be described. For example, area division processing for dividing an image into areas of different attributes, such as text, a photo, and a table, is performed on the document image detected in step S302. Then, the CPU 111 determines that a predetermined condition is satisfied if the document image includes areas of a plurality of attributes. If the document image includes areas of a plurality of attributes (for example, a text area and a photo area), any one of the areas is likely to be used as a repeat target. The processing then proceeds to step S312, and the CPU 111 displays the repeat target area specification screen of FIG. 9.

Details of the processing of steps S301 to S312 in FIG. 12 are similar to those of the processing of the corresponding step numbers in the first and second exemplary embodiments. A description thereof will thus be omitted.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit, or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Other Embodiments

Embodiments of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computerized configuration(s) of the system or apparatus by, for example, reading out and executing the computer executable instructions from the storage medium to perform the functions of one or more of the above-described embodiments and/or controlling the one or more circuits to perform the functions of one or more of the above-described embodiments. The computerized configuration(s) may comprise one or more processors, one or more memories, circuitry, or a combination thereof (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-045959, filed Mar. 13, 2018, which is hereby incorporated by reference herein in its entirety.

What is claimed is:

1. An image processing apparatus comprising:
a memory that stores a program; and
a processor that executes the program to perform:
obtaining a tilt-corrected document image by performing image analysis processing on a scan image to detect a document area and performing extraction and tilt correction of a document image based on the detected document area;
displaying a repeat target area specification screen for displaying the obtained tilt-corrected document image and a frame indicating a repeat target area, wherein the frame is initially displayed at a position of four sides aligned with the obtained tilt-corrected document image, and wherein the position of the frame can be changed based on a user's instruction on the repeat target area specification screen, and wherein the processor specifies the repeat target area based on the position of the frame initially displayed or changed on the repeat target area specification screen;
calculating numbers of laid out images in repeatedly laying out an image corresponding to the specified repeat target area for a respective plurality of candidate sheet sizes;
displaying a list screen showing the calculated numbers for the respective plurality of candidate sheet sizes;
generating a repeat layout-processed output image by repeatedly laying out the image corresponding to the specified repeat target area within a sheet size specified by the user from among the plurality of candidate sheet sizes displayed on the list screen; and
executing print processing using the generated repeat layout-processed output image.

2. The image processing apparatus according to claim 1, wherein the processor executes the program to further perform:
displaying a preview screen including a preview image of the generated repeat layout-processed output image,
wherein, in a case where the user issues an instruction to start printing on the preview screen, the print processing using the repeat layout-processed output image is executed.

3. The image processing apparatus according to claim 2, wherein in a case where the user issues an instruction to change the repeat target area on the preview screen, the processor further displays a repeat target area specification screen for displaying the tilt-corrected document image and a frame indicating the currently specified repeat target area, wherein the position of the frame can be re-changed based on the user's instruction on the repeat target area specification screen, and wherein the processor re-specifies the repeat target area based on the position of the frame displayed on the repeat target area specification screen.

4. An image processing apparatus comprising:
a memory that stores a program; and
a processor that executes the program to perform:
obtaining a tilt-corrected document image by performing image analysis processing on a scan image to detect a document area and performing extraction and tilt correction of a document image based on the detected document area;
determining whether the obtained tilt-corrected document image satisfies a predetermined condition;
displaying, in a case where it is determined that the tilt-corrected document image satisfies the predetermined condition, a repeat target area specification screen so that the processor specifies a repeat target area for the tilt-corrected document image based on a user's instruction on the displayed repeat target area specification screen;
calculating, in a case where it is determined that the tilt-corrected document image does not satisfy the predetermined condition, numbers of laid out images in repeatedly laying out an image corresponding to a repeat target area, that is set automatically based on the obtained tilt-corrected document image, for a respective plurality of candidate sheet sizes; and
displaying a list screen showing the calculated numbers for the respective plurality of candidate sheet sizes.

5. The image processing apparatus according to claim 4, wherein in a case where the tilt-corrected document image has a size greater than a predetermined size, the processor determines that the predetermined condition is satisfied.

6. The image processing apparatus according to claim 4, wherein in a case where the tilt-corrected document image includes areas of a plurality of attributes, the processor determines that the predetermined condition is satisfied.

7. The image processing apparatus according to claim 4, wherein, in a case where it is determined that the tilt-corrected document image satisfies the predetermined condition, the processor displays the repeat target area specification screen for displaying the obtained tilt-corrected document image and a frame indicating the repeat target area, wherein the frame is initially displayed at a position corresponding to the obtained tilt-corrected document image, and wherein the position of the frame can be changed based on the user's instruction on the displayed repeat target area specification screen, wherein the processor specifies the repeat target area based on the position of the frame initially displayed or changed on the displayed repeat target area specification screen.

8. The image processing apparatus according to claim 4, wherein the processor further generates a repeat layout-processed output image by repeatedly laying out an image corresponding to the repeat target area within a sheet size specified by the user from among the plurality of candidate sheet sizes displayed on the list screen, and executes print processing using the generated repeat layout-processed output image.

9. The image processing apparatus according to claim 8, wherein the processor further displays a preview screen including a preview image of the generated repeat layout-processed output image,
wherein, in a case where the user issues an instruction to start printing on the preview screen, the print processing using the repeat layout-processed output image is executed.

10. The image processing apparatus according to claim 4, wherein, in a case where it is determined that the tilt-corrected document image satisfies the predetermined condition, the processor further calculates numbers of laid out images in repeatedly laying out the repeat target area specified via the displayed repeat target area specification screen for the plurality of candidate sheet sizes, and displays the list screen showing the calculated numbers of laid out images for the respective plurality of candidate sheet sizes.

11. The image processing apparatus according to claim 10,
wherein, in a case where it is determined that the tilt-corrected document image satisfies the predetermined condition, the processor further generates a repeat layout-processed output image by repeatedly laying out an image corresponding to the specified repeat target area within a sheet size specified by the user from among the plurality of candidate sheet sizes displayed on the list screen, and executes print processing using the generated repeat layout-processed output image.

12. The image processing apparatus according to claim 11, wherein the processor further displays a preview screen including a preview image of the generated repeat layout-processed output image,
wherein, in a case where the user issues an instruction to start printing on the preview screen, the print processing using the repeat layout-processed output image is executed.

13. An image processing method executed by an image processing apparatus, the method comprising:
obtaining a tilt-corrected document image by performing image analysis processing on a scan image to detect a document area and performing tilt correction of a document image based on the detected document area;
displaying a repeat target area specification screen for displaying the obtained tilt-corrected document image and a frame indicating a repeat target area, wherein the frame is initially displayed at a position of four sides aligned with the obtained tilt-corrected document image, and wherein the position of the frame can be changed based on a user's instruction on the repeat target area specification screen, and wherein the repeat target area is specified based on the position of the frame initially displayed or changed on the repeat target area specification screen;
calculating numbers of laid out images in repeatedly laying out an image corresponding to the specified repeat target area for a respective plurality of candidate sheet sizes;
displaying a list screen showing the calculated numbers for the respective plurality of candidate sheet sizes;
generating a repeat layout-processed output image by repeatedly laying out the image corresponding to the specified repeat target area within a sheet size specified by the user from among the plurality of candidate sheet sizes displayed on the list screen; and
executing print processing using the generated repeat layout-processed output image.

14. An image processing method executed by an image processing apparatus, the method comprising:
obtaining a tilt-corrected document image by performing image analysis processing on a scan image to detect a document area and performing tilt correction of a document image based on the detected document area;
determining whether the obtained tilt-corrected document image satisfies a predetermined condition;
displaying, in a case where it is determined that the tilt-corrected document image satisfies the predetermined condition, a repeat target area specification screen so that a repeat target area for the tilt-corrected document image is specified based on a user's instruction on the displayed repeat target area specification screen;
calculating, in a case where it is determined that the tilt-corrected document image does not satisfy the predetermined condition, numbers of laid out images in repeatedly laying out an image corresponding to a repeat target area, that is set automatically based on the obtained tilt corrected document image, for a respective plurality of candidate sheet sizes; and
displaying a list screen showing the calculated numbers for the respective plurality of candidate sheet sizes.

15. A non-transitory storage medium storing a program for causing a computer to perform:
obtaining a tilt-corrected document image by performing image analysis processing on a scan image to detect a document area and performing tilt correction of a document image based on the detected document area;
displaying a repeat target area specification screen for displaying the obtained tilt-corrected document image and a frame indicating a repeat target area, wherein the frame is initially displayed at a position of four sides aligned with the obtained tilt-corrected document image, and wherein the position of the frame can be changed based on a user's instruction on the repeat target area specification screen, and wherein the repeat target area is specified based on the position of the frame initially displayed or changed on the repeat target area specification screen;
calculating numbers of laid out images in repeatedly laying out an image corresponding to the specified repeat target area for a respective plurality of candidate sheet sizes;
displaying a list screen showing the calculated numbers for the respective plurality of candidate sheet sizes;
generating a repeat layout-processed output image by repeatedly laying out the image corresponding to the specified repeat target area within a sheet size specified by the user from among the plurality of candidate sheet sizes displayed on the list screen; and executing print processing using the generated repeat layout-processed output image.

16. A non-transitory storage medium storing a program for causing a computer to perform:

obtaining a tilt-corrected document image by performing image analysis processing on a scan image to detect a document area and performing tilt correction of a document image based on the detected document area;

determining whether the obtained tilt-corrected document image satisfies a predetermined condition;

displaying, in a case where it is determined that the tilt-corrected document image satisfies the predetermined condition, a repeat target area specification screen so that a repeat target area for the tilt-corrected document image is specified based on a user's instruction on the displayed repeat target area specification screen;

calculating, in a case where it is determined that the tilt-corrected document image does not satisfy the predetermined condition, numbers of laid out images in repeatedly laying out an image corresponding to a repeat target area, that is set automatically based on the obtained tilt corrected document image, for a respective plurality of candidate sheet sizes; and displaying a list screen showing the calculated numbers for the respective plurality of candidate sheet sizes.

* * * * *